(12) United States Patent
Vannithamby et al.

(10) Patent No.: US 7,773,502 B2
(45) Date of Patent: Aug. 10, 2010

(54) DYNAMIC VOICE OVER DATA PRIORITIZATION FOR WIRELESS COMMUNICATION NETWORKS

(75) Inventors: Rath Vannithamby, San Diego, CA (US); Long L. Duan, San Diego, CA (US); Reza Shahidi, Stockholm (SE); Wanshi Chen, San Diego, CA (US); Seema Madan, San Diego, CA (US)

(73) Assignee: Telefonaktiebolaget lm Ericsson (publ), Stockholm (SE)

( * ) Notice: Subject to any disclaimer, the term of this patent is extended or adjusted under 35 U.S.C. 154(b) by 1740 days.

(21) Appl. No.: 10/857,197

(22) Filed: May 28, 2004

(65) Prior Publication Data

US 2005/0107091 A1    May 19, 2005

(51) Int. Cl.
*H04L 1/00*    (2006.01)
(52) U.S. Cl. .................................. 370/229; 370/329
(58) Field of Classification Search .................. None
See application file for complete search history.

(56) References Cited

U.S. PATENT DOCUMENTS

| 6,463,044 | B1 * | 10/2002 | Seo ............................ 370/329 |
| 6,519,461 | B1 | 2/2003 | Anderson et al. |
| 6,529,527 | B1 * | 3/2003 | Chen et al. .................. 370/503 |
| 6,700,881 | B1 * | 3/2004 | Kong et al. .................. 370/335 |
| 6,775,541 | B2 * | 8/2004 | Dillon et al. ............. 455/422.1 |
| 6,928,289 | B1 * | 8/2005 | Cho et al. ................. 455/452.2 |
| 6,934,555 | B2 * | 8/2005 | Silva et al. .................... 455/522 |
| 6,975,609 | B1 * | 12/2005 | Khaleghi et al. ............. 370/335 |
| 7,245,598 | B2 * | 7/2007 | Puig-Oses et al. ........... 370/334 |
| 2005/0107107 | A1 * | 5/2005 | Shahidi et al. .............. 455/522 |

FOREIGN PATENT DOCUMENTS

WO    WO 2005/053252    6/2005

OTHER PUBLICATIONS

Huang et al, Performance of a Mixed-Traffic CDMA2000 Wireless Network with Scalable streaming Video, IEEE, pp. 973-981, Oct. 2003.*

* cited by examiner

*Primary Examiner*—Frank Duong
(74) *Attorney, Agent, or Firm*—Coats & Bennett, P.L.L.C.

(57) ABSTRACT

In a wireless communication network providing voice and data services, one or more entities in the network, such as a base station controller and/or radio base station, can be configured to reduce data services overhead responsive to detecting a congestion condition, thereby increasing the availability of one or more network resources for voice services. In one or more exemplary embodiments, one or more current data services users are targeted for modification of their ongoing data services to effect the reduction in data services overhead. Modifications can include, but are not limited to, any one or more of the following: forward or reverse link data rate reductions, and shifting of forward or reverse link traffic from dedicated user channels to shared user channels. Targeting of users for service modification can be based on reported channel quality information. For example, users reporting poor radio conditions can be targeted first for service modifications.

41 Claims, 9 Drawing Sheets

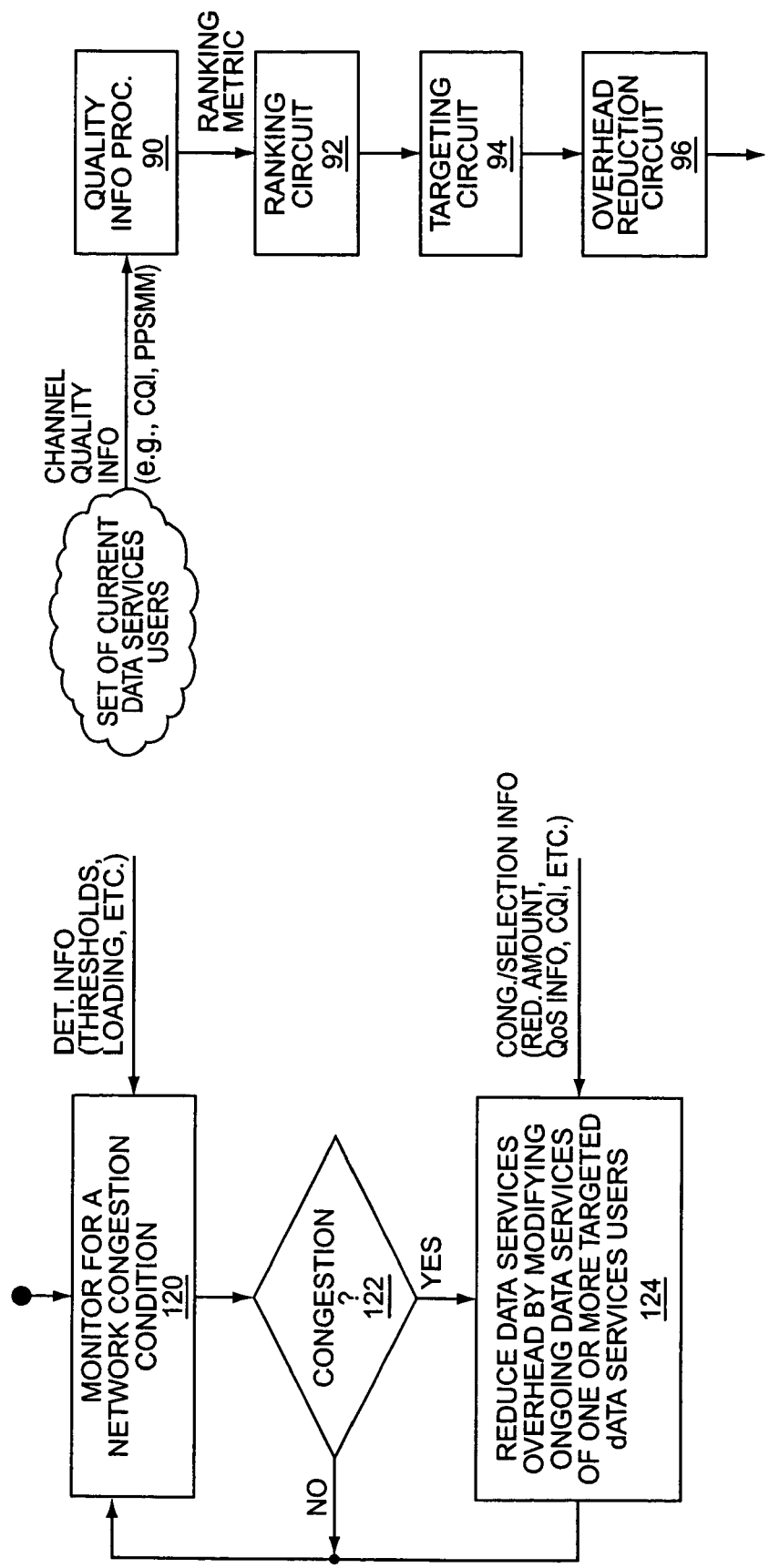

DYNAMIC VOICE OVER DATA PRIORITIZATION FOR WIRELESS COMMUNICATION NETWORKS

RELATED APPLICATIONS

This application claims priority under 35 U.S.C. §120 from the and commonly assigned utility patent application filed under the same title as the instant application on 19 Nov. 2003, and assigned Ser. No. 10/717,071. That application is incorporated by reference herein in its entirety.

BACKGROUND OF THE INVENTION

The present invention generally relates to wireless communication networks, and particularly relates to prioritizing voice communication over data communication in such networks.

Many wireless communication networks, such as cdma2000, offer a wide variety of services, such as high quality voice, data, video, interactive applications, etc. Evolving wireless communication networks provide a range of packet-based data services, while simultaneously providing support for the more traditional circuit-switched services such as voice and fax data. In such networks, the radio base stations carry user traffic for both circuit-switched (voice) and packet-switched (data) users. Thus, voice and data users share the base station's limited resources, such as its available forward link transmit power and its pool of assignable CDMA spreading codes (e.g., the available Walsh codes).

Several issues arise in the context of base station resource sharing between voice and data users. For example, most data services are relatively delay insensitive and data traffic commonly is transmitted intermittently as needed, rather than continuously streamed. Contrastingly, voice services represent real-time services that require instantaneous transmission, and are relatively delay sensitive. Voice services also require a high-grade of service, such as a low call blocking rate, and a relatively low frame error rate (FER). Further, service providers typically garner larger revenues from voice services than from data services. As a result, there is an economic incentive for service providers to ensure that packet data services do not compromise the network's ability to offer high quality voice service.

Static voice-over-data prioritization is one solution meant to address the above sharing issues, and is adopted in at least some conventional wireless communication networks. Static prioritization of voice over data may be based on setting a higher call-blocking (admission) threshold for voice users than for data users with respect to a shared resource. For example, the blocking threshold for data users might be set at a first usage level (e.g., ninety percent), while the call-blocking threshold for voice users is set at a second, higher usage level (e.g., ninety-five percent). Similar schemes involve reserving a fixed amount of power for voice users, or involve using separate carriers, one for voice and one for data.

All such schemes tend to be inefficient because of the static nature of the prioritization schemes. That is, such schemes build in a preference for voice service that disadvantages data users even if the actual resource usage by voice users, or by the combination of voice and data users, is low.

SUMMARY OF THE INVENTION

The present invention comprises a method and apparatus that provides dynamic voice-over-data prioritization in a wireless communication network by reducing data services overhead responsive to detecting one or more congestion conditions. Thus, in a wireless communication network providing both voice and data services, an exemplary embodiment of the present invention comprises a method of dynamically prioritizing voice services over data services based on reducing data services overhead to increase network resources available for voice services in response to detecting a congestion condition by modifying ongoing data services of one or more targeted ones in a plurality of current data services users.

Identifying the targeted ones in the plurality of current data services users may be based at least in part on channel quality information received for one or more in the plurality of current data services users. Preferably, such channel quality information is received from at least some of the active data services users in the form of channel quality indictors, or the like. Thus, identifying the service modification targets may comprise ranking one or more current data services users according to channel quality indicators received for those current data services users, and selecting one or more of those current data services users in rank order as the targeted ones. Such selection may be configured simply to rank users from worst-to-best indicated channel conditions, such that ongoing data services of one or more of the users in the worst channel conditions are modified. The number of users affected, and the extent to which, or the manner in which, their ongoing services are modified may be a function of the desired amount of congestion relief. Further, the ranking may incorporate service "fairness," Quality-of-Service constraints, user class, etc.

Modification of service may comprise lowering the current data services overhead by lowering the data rates of one or more channels allocated to one or more of the current data services users. For example, one or more dedicated traffic channels being used to transmit or receive data from one or more current data services users can be set to a lower data rate, thereby reducing the network resources needed to support those channels, which relieves, or at least reduces, the congestion condition.

Further, service modification may comprise shifting data traffic from one or more dedicated channels to one or more shared channels, which can be advantageous because such shared channels typically are more efficient in terms of resource utilization. Thus, in a wireless communication network providing both voice and data services, a method of dynamically prioritizing voice services over data services comprises detecting a congestion condition, and shifting data services traffic from one or more dedicated channels to one or more shared channels responsive to detecting the congestion condition. For example, in cdma2000 or Wideband CDMA (WCDMA) networks, data traffic being carried on one or more dedicated channels can be shifted to a high-speed shared packet data channel, such as the Forward Packet Data Channel (F-PDCH) in cdma2000, or the High Speed Downlink Shared Packet Data Channel (HSDSPCH) in WCDMA.

In these and other networks, an exemplary base station system comprises one or more monitoring circuits configured to detect a congestion condition, and one or more control circuits operatively associated with the one or more monitoring circuits and configured to reduce data services overhead responsive to detection of the congestion condition based on modifying ongoing data services of one or more targeted ones in a plurality of current data services users. The one or more control circuits further may be configured to identify the targeted ones in the plurality of current data services users based at least in part on channel quality information received for one or more in the plurality of current data services users.

Again, service modification can be based on lowering data rates and/or shifting traffic from dedicated to shared channels, and modification target identification can be based on channel quality information ranking, with or without fairness, QoS, or other considerations.

Of course, the present invention is not limited by the above examples and details. Other features and advantages of the present invention will be apparent to those skilled in the art in light of the following description and the accompanying figures.

BRIEF DESCRIPTION OF THE DRAWINGS

FIG. 9 is a diagram of exemplary processing logic to provide dynamic prioritization of user types according to one or more embodiments of the present invention.

FIG. 10 is a diagram of exemplary functional circuits configured to carry out the processing of FIG. 9, for example.

DETAILED DESCRIPTION OF THE INVENTION

The following discussion describes the present invention in the context of cdma2000-based networks at various points. However, it should be understood that the present invention applies to any type of wireless communication network where different types of users, e.g., voice and data users, share one or more limited resources and it is desired to prioritize the use of those resources by one type of user relative to another type of user.

Figure 1:
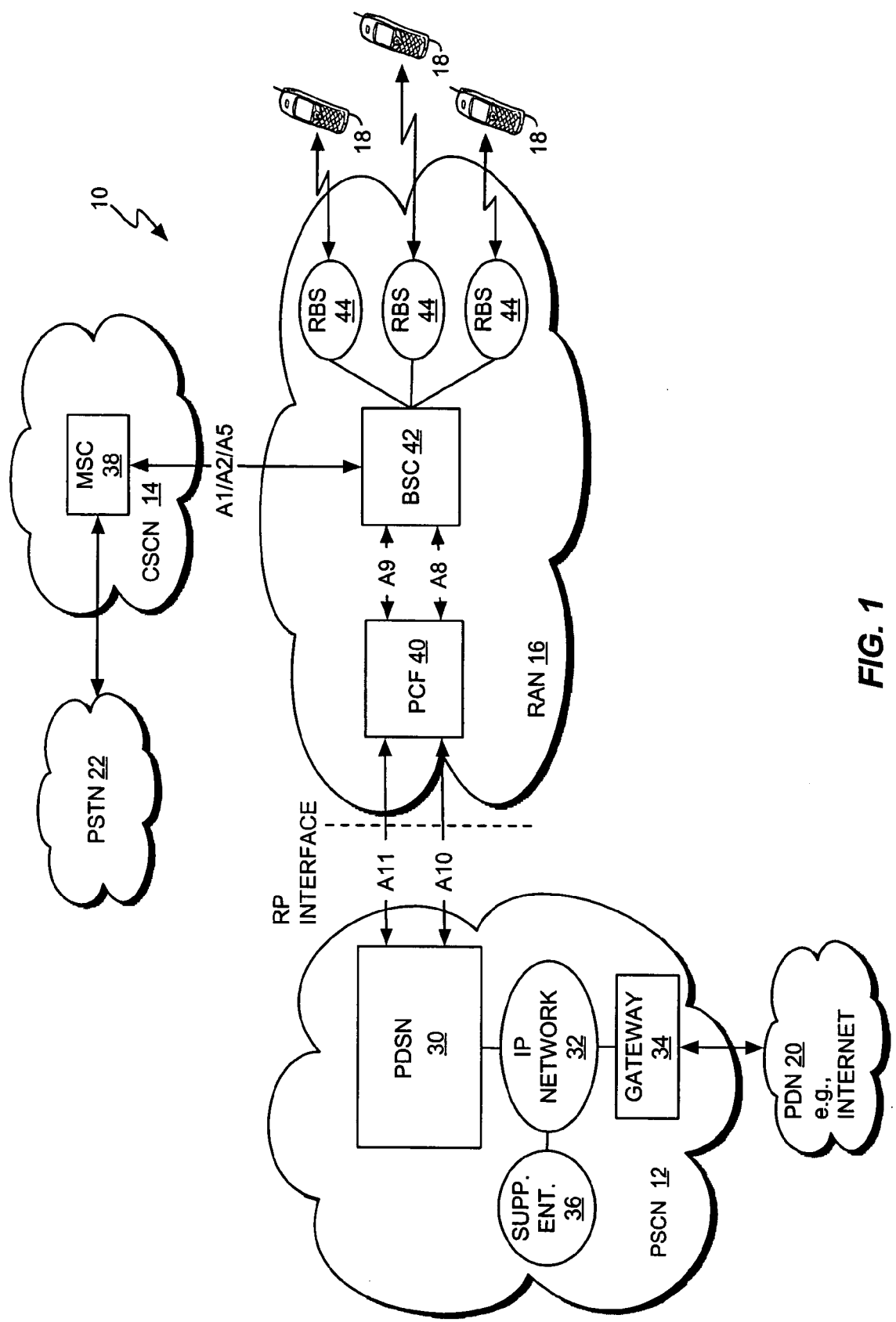
FIG. 1 is a diagram of an exemplary wireless communication network that is configured according to one or more embodiments of the present invention.

Turning to the drawings, FIG. 1 illustrates an exemplary wireless communication network 10 that is configured according to one or more embodiments of the present invention. Network 10 may comprise a cdma2000 wireless network according to the IS-2000/2001 families of standards. However, those skilled in the art will appreciate that the wireless communication network may be configured according to other standards, such as Wideband CDMA (WCDMA) standards, for example. Network 10 comprises a Packet-Switched Core Network (PSCN) 12, a Circuit-Switched Control Network (CSCN) 14, and a Radio Access Network (RAN) 16 that support communication between users of mobile stations (MSs) 18 and various external networks, such as one or more Public Data Networks (PDNs, e.g., the Internet) 20 and the Public Switched Telephone Network (PSTN) 22. The details of PSTN 22 and PDNs 20 are not material to the present invention, and therefore, are not discussed further herein.

Further, details of the core networks themselves are not particularly germane to the present invention but their illustration is helpful as a backdrop against the discussion of networks providing both voice and data services. Thus, an exemplary PSCN 12 supports packet data services and comprises a Packet Data Serving Node (PDSN) 30, an IP network 32, an optional gateway router 34, and one or more supporting entities 36 (authentication, foreign agent, etc.). An exemplary CSCN 14 supports voice and other circuit switched services and includes a Mobile Switching Center (MSC) 38, along with various other entities not illustrated for clarity of discussion (e.g., Home Location Register, Visitor Location Register, etc.).

The RAN 16 provides the radio interface between the mobile stations 18 and the various core networks, and an exemplary RAN 16 comprises a Packet Control Function (PCF) 40, a Base Station Controller (BSC) 42, and associated Radio Base Stations (RBSs) 44. BSC 42 connects to the MSC 38 via an A1/A2/A5 interface, to the PCF 40 via an A8/A9 interface, and to the RBSs 44 via an Abis interface. MSs 18 connect to RBSs 44 via the Um interface—i.e., the "air interface" as defined by the appropriate network standards, such as the IS-2000 family of standards.

The IS-2000 standard defines forward link fundamental channels (F-FCHs) that are used as dedicated forward link communication channels used to serve individual voice and data users. For example, a data user may be assigned a F-FCH to support packet data service to that user. If the data rate limits of the F-FCH are insufficient for the user's needs, one or more forward link supplemental channels (F-SCHs) may be assigned to the user. F-SCHs can be configured to support data rates that are multiples of the F-FCH data rate, and thus such channels are configured with data rates of 1×, 2×, 4×, and so on.

Traffic between PSTN 22 and mobile stations 18 comprises circuit-switched traffic, such as voice or facsimile data, while traffic between PDN 20 and mobile stations 18 comprises packet-switched data traffic. (Note that an Inner-Working Function, IWF, might provide a communication link between the PSCN and CSCN core networks but such operation need not be explained in the context of the present discussion.) RBS 44 thus provides support to mobile stations 18 engaged in voice communications (referred to herein as voice users) and supports mobile stations 18 engaged in packet data communications (referred to herein as data users). Voice and data users share limited resources at RBS 44. These limited resources may include, but are not limited to, forward link transmit power and CDMA spreading codes, e.g., Walsh codes that are used to encode data for individual users.

Figure 2:
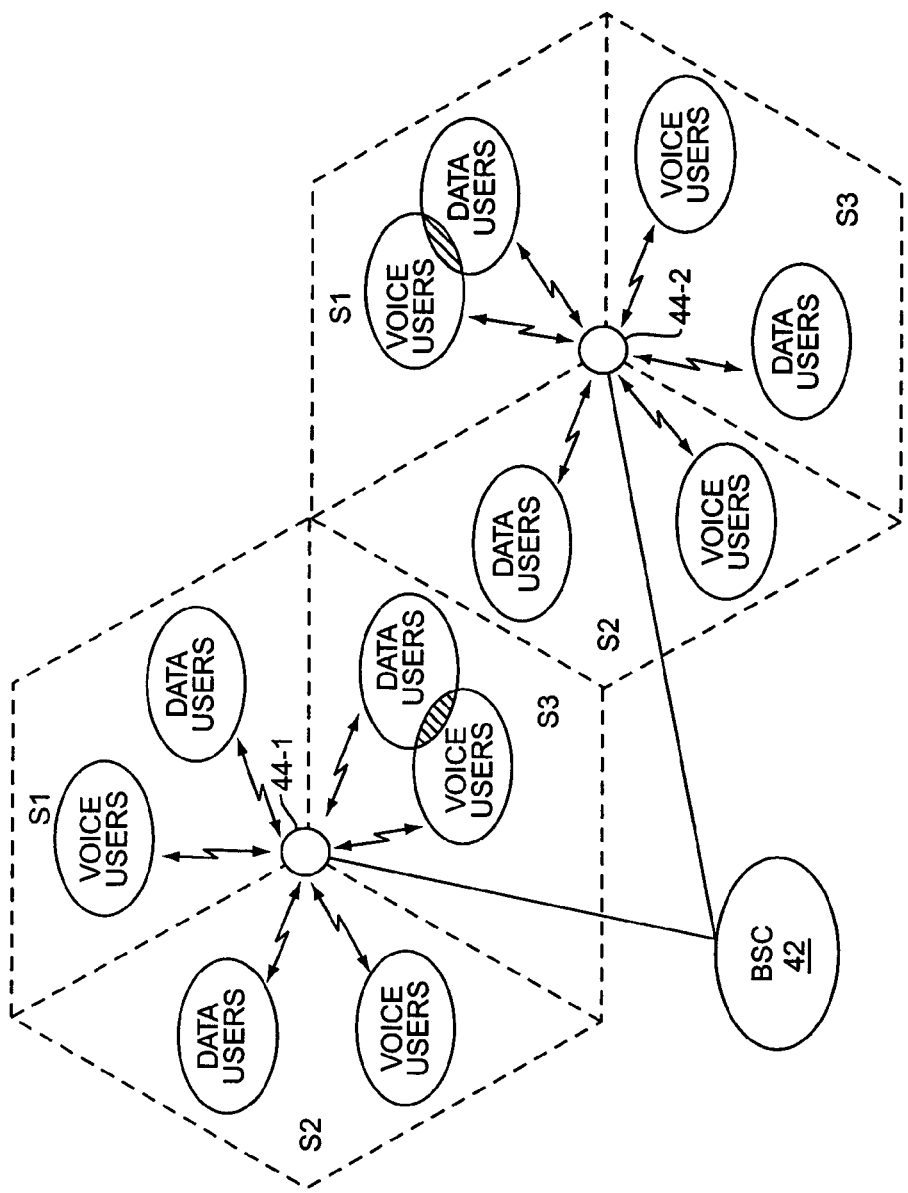
FIG. 2 is a diagram of exemplary sectorized radio base station coverage.

Each RBS 44 provides wireless coverage over one or more service areas or sectors, as shown in FIG. 2. In the context of the present invention, the shared resource(s) of interest may be shared by voice and data users at the sector level, or may be shared at the RBS level. Within any given service area, there may be a plurality of voice services users, and a plurality of data services users. In some cases, such as where concurrent services are supported, given mobile stations 18 may belong to the group of voice services users, and to the group of data services users. Also, while the RBSs 44 shown in FIG. 2 each provide coverage over multiple sectors (e.g., sectors S1, S2, and S3), it will be understood by those skilled in the art that the wireless coverage area of each RBS 44 may be divided into one or any number of sectors.

Figure 3:
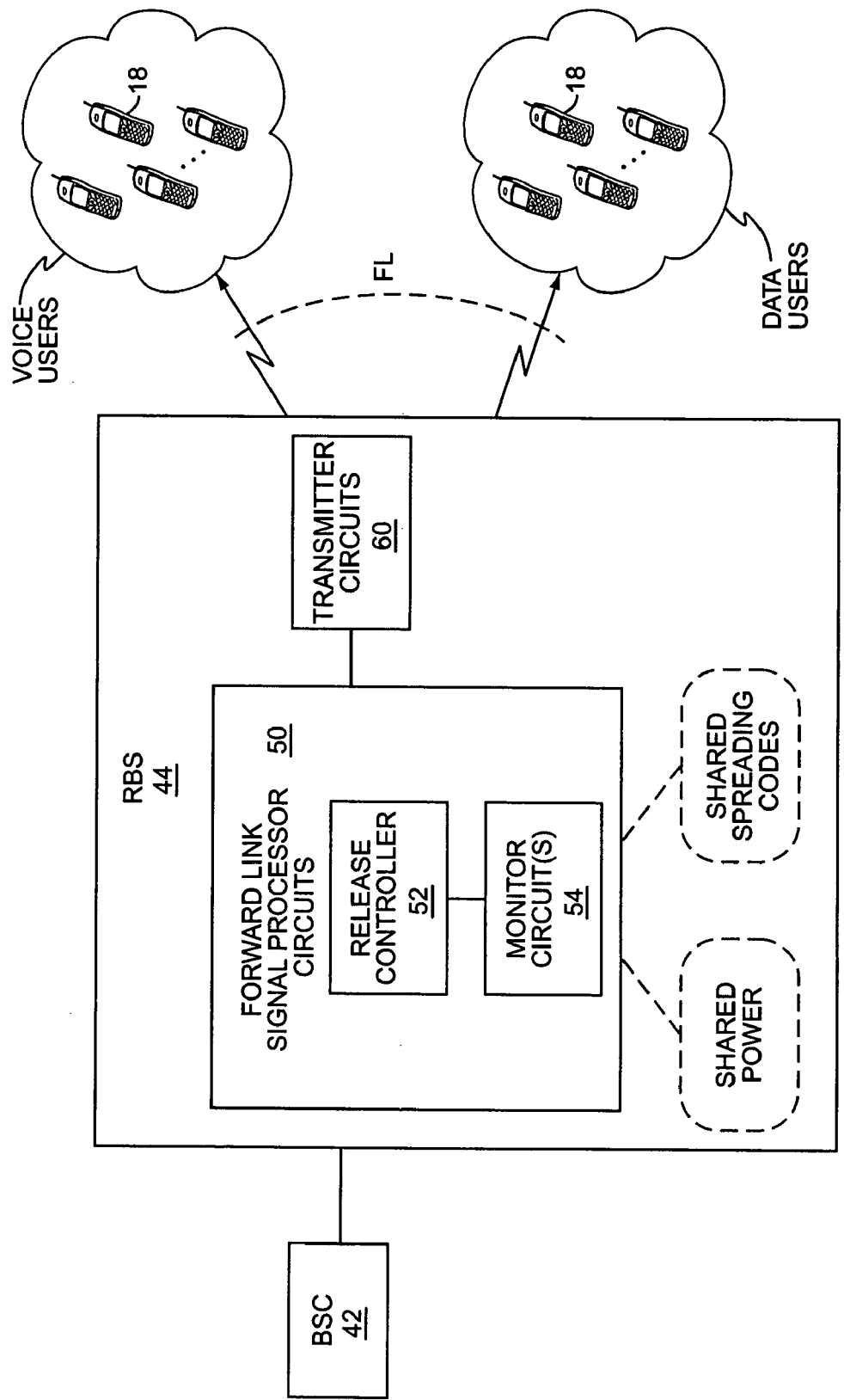
FIG. 3 is a diagram of exemplary functional details for a radio base station according to one or more embodiments of the present invention.

FIG. 3 illustrates a functional diagram of an exemplary RBS 44 according to one embodiment of the present invention. It will be appreciated that the present invention is not limited to the RBS architecture illustrated in FIG. 3, and that other RBS architectures are applicable to the present invention. Further, the functional elements of FIG. 3 may be implemented in software, hardware, or some combination of both. For example, one or more of the functional elements in RBS 44 may be implemented as stored program instructions executed by one or more microprocessors or other logic circuits included in RBS 44.

As shown in FIG. 3, RBS 44 includes forward link signal processor circuits 50 and associated transmitter circuits 60 (e.g., amplifiers, modulators, encoders, etc.). Circuits 50 process communication traffic incoming from the BSC for transmission to both voice and data users via transmitter circuits 60. According to the present invention, RBS 44 includes a release controller 52 and one or more associated monitor circuits 54. These elements may be implemented separately from or as part of processing circuits 50. In either case, the release controller 52 and monitor circuits 54 may be implemented in hardware, software, or some combination of both, and the monitor circuits 54 may be integrated with, or form part of, release controller 52. In an exemplary embodiment, the present invention comprises, at least in part, a computer program comprising stored program instructions that are executed by one or more microprocessors or other processing circuits within RBS 44.

As depicted in the illustration, RBS 44 supports communication services using one or more finite resources, e.g., a limited amount of forward link transmit power, or a limited number of forward link spreading codes. For example, if RBS 44 has a maximum of twenty Watts of forward link transmit power available for serving mobile stations 18 in a given sector, then the number of mobile stations 18 that it can simultaneously serve on the forward link is power-limited. Similarly, the exemplary RBS 44 may have at most sixty-four 64-length Walsh codes, where each code supports service to one individual mobile station if used as a short code (64-length), or can support service to two individual users if used as a long code (two 128-length codes can be derived from each 64-length code). Thus, to gain back (release) spreading codes, the RBS 44 may change one or more of the data users from using spreading codes in the base set of spreading codes (64-length codes) to using spreading codes in the extended set of spreading codes (128-length codes).

Monitor circuits 54 obtain, or are otherwise provided with, resource usage information for the shared resource(s) of interest. Such usage information can be in the form of current resource allocation levels, such as the current combined usage level of the resource by voice and data users, or can be in the form of remaining resource availability, e.g., the percentage or amount of the resource that is free for allocation. Thus, in an exemplary embodiment, the monitor circuits 54 may track the percentage or amount of transmit power and/or spreading codes used by the voice and data users currently being supported by the RBS 44.

Figure 4A:
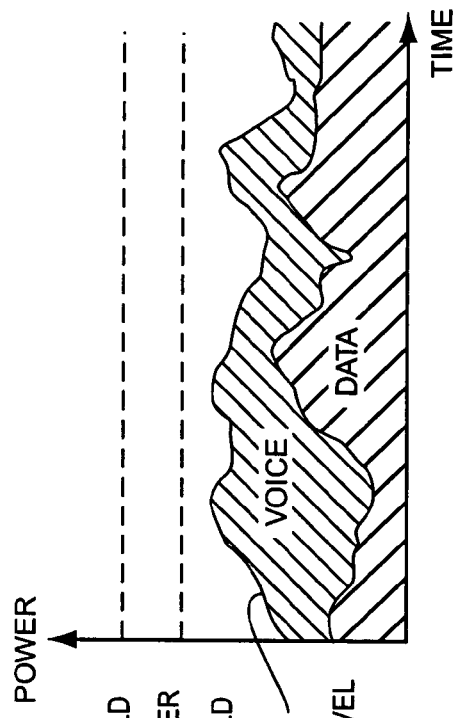
FIGS. 4A and 4B are diagrams of typical transmit power fluctuations over time and illustrate changing combined usage of base station transmit power by simultaneous voice and data users.
Figure 4B:
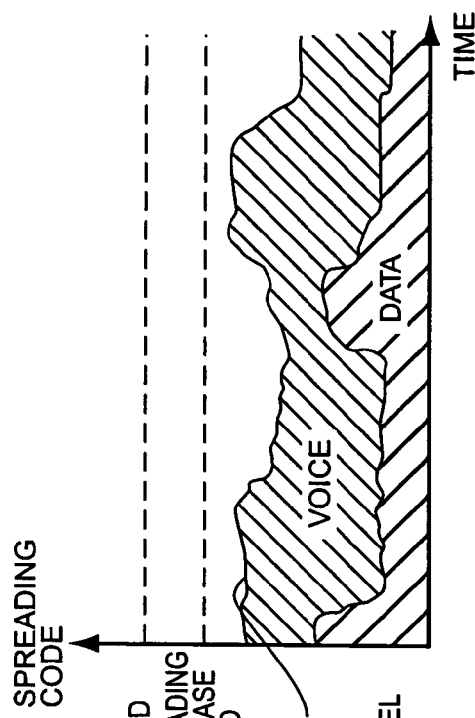
Figure 5A:
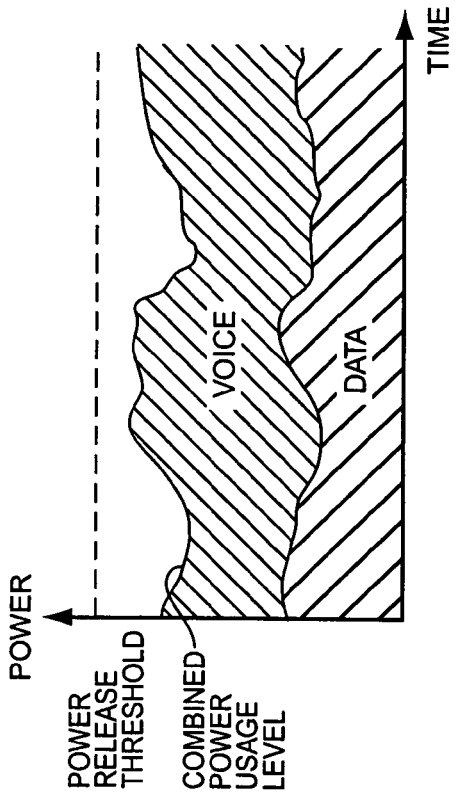
FIGS. 5A and 5B are diagrams of typical spreading code usage fluctuations over time and illustrate changing combined usage of spreading code resources by simultaneous voice and data users.
Figure 5B:
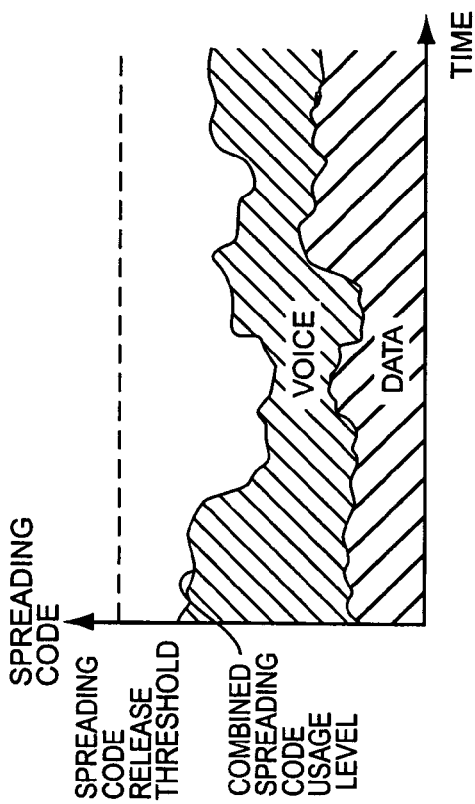

FIGS. 4A and 4B illustrate typical combined power usage levels for RBS 44, and illustrate that the total (combined) power required to service the aggregate of voice and data users on the forward link fluctuates over time with changing data requirements and with changing radio conditions for the individual users. Further, the portion of aggregate power used by the data users, and the portion used by the voice users fluctuate over time as well. Similarly, FIGS. 5A and 5B illustrate time varying allocation levels of spreading codes.

In particular, FIG. 4A illustrates monitoring a combined power usage relative to a release threshold, which may be set coincident to a data user call-blocking threshold. If the combined power usage reaches the defined release threshold, the RBS 44 dynamically releases (frees) a desired amount of forward link transmit power by altering its service to one or more of the current data users. In this manner, when the combined power usage rises to a level that will begin to compromise voice service to existing or new voice users, the RBS 44 releases some of the transmit power that currently is allocated to the existing data users.

FIG. 4B illustrates a similar approach, but here network 10 also uses a static prioritization method, wherein it defines a first call-blocking threshold for data users, and a second, higher call blocking threshold for voice users. In an exemplary embodiment, the release threshold of the present invention is set coincident with the lower, data-user blocking threshold, such that a desired amount of power is released from one or more data users responsive to the combined usage reaching the data user blocking threshold.

When monitoring the level of the combined transmit power usage, monitor circuits 54 may receive transmit power data corresponding to the combined transmit power of all voice and data forward link channels for comparison against the release threshold. Resource controller 52 may use an averaged usage level for comparison to the release threshold, such that a smoothed value is used for the comparison.

FIGS. 5A and 5B illustrate similar methods but in the context of spreading code resources. It should be noted that the present invention may include dynamic release of either or both spreading codes and transmit power, and that a release threshold can be defined for any shared resource of interest, and the appropriate release procedure invoked upon reaching that threshold. Those skilled in the art will appreciate that more than one resource may be monitored at a time, and that the exemplary resource release methods described herein can be applied to multiple resources simultaneously. For example, RBS 44 may monitor a power usage level against a power release threshold while simultaneously monitoring a spreading code usage level against a spreading code release threshold.

Regardless, if the combined usage of a shared resource of interest meets or exceeds a corresponding defined release threshold, release controller 52 dynamically releases a portion of that resource by modifying ongoing service to one or more of the current data users. In that sense, data users are penalized relative to voice users because the release controller 52 targets data users for resource release. More broadly, the release controller 52 can be configured to prioritize any type of user over any other type of user, such that if resources need to be freed, the non-priority users are targeted for such release.

When releasing resources, the release controller 52 determines the amount of resources to release, e.g., how much power should be freed, or how many spreading codes should be freed. In one embodiment, release controller 52 determines a target reduction amount by evaluating how far the combined usage is beyond the defined release threshold. In another embodiment, release controller 52 may use a predetermined target reduction amount to reduce the combined usage level by a set amount each time the combined usage level meets or exceed the release threshold. Such a value can be stored in memory in RBS 44, and may be a configuration value set by the network operator or service provider. In any case, the target reduction amount preferably reduces the combined current usage level by an amount sufficient to avoid "chatter" around the release threshold level. That is, the targeted release amount should be large enough to avoid immediate re-triggering of the release method.

In either case, the resource release may be performed in consideration of minimum required resource usage by the data users, for example. In other words, the release controller 52 may temper or otherwise constrain its operations to maintain a minimum usage level of the resource(s) by the data users. Such minimums may be configured by the network operator, or may be imposed by minimum data rate requirements, etc., such as minimum defined rates for the communication channels being used by the data users.

In any case, to reduce the combined usage by the target reduction amount, the release controller 52 may modify ongoing service to one or more data users, such as by modifying one or more transmit parameters corresponding to those users. For example, RBS 44 can reduce the amount of power allocated to one or more of the forward link communication channels being used to serve one or more of the current data users. Such a power reduction can be made directly by reducing the upper limits on transmit power to be used for the channel(s), e.g., by reducing the allowable power allocation for a channel from 5 Watts to 3 Watts, for example. Power reduction also can be made indirectly by initiating a data rate reduction on one or more data users' forward link communication channels. Other mechanisms for reducing a data user's forward link power allocation include, but are not limited to, changing the user's radio configuration, i.e., changing between RC3 and RC4 in an IS-2000 system, and/or changing channel encoding rates.

In an exemplary embodiment, the monitor circuits 54 track the average power used to transmit on individual forward link channels to one or more of the data users. To reduce the power to a particular data user, the RBS 44 changes the maximum allowed channel power for the user from its current setting to a value below the tracked average power. For example, in a cdma2000 network, the RBS 44 may effect power release by lowering the transmit power on one or more data users' forward link supplemental channels (F-SCH), which are rate-adjustable. Thus, RBS 44 may track the average supplemental channel powers for all or some of the data users and, if a power release is required, it will effect that release by reducing the maximum allowed transmit power for one or more of the F-SCHs to levels below the average transmit power tracked for those channels.

For example, assume that monitor circuits 54 determine that RBS 44 is transmitting on a particular data user's F-SCH at average power of 3 W but the channel has an upper (allowed) transmit power limit of 5 W. To reclaim power from this data user, release controller 52 may reduce the maximum transmit power allowed for the F-SCH from 5 W to 2 W, for example, resulting in a power release of about 1 W. This example is intended for illustrative purposes only, and it should be understood that essentially any method for reducing the transmit power known to those skilled in the art may be used in accordance with the present invention.

In another exemplary embodiment, release controller 52 may reduce the combined transmit power by changing a radio service configuration and/or by reducing the data rate of selected current data users, both of which relate to the transmit power. For example, release controller 52 may reduce the transmit power of one or more selected data users that currently are using 128-length Walsh codes by reassigning them to 64-length Walsh codes. Alternatively, because F-SCHs transmit data at incrementally higher data rates than F-FCHs, and therefore, at higher transmit powers, release controller 52 may impose rate reductions on one or more of those F-SCHs to gain a commensurate reduction in required forward link power.

It should be noted that, if spreading codes are the resource of interest, one or more of the above release methodologies also apply to code release operations. For example, changing radio conditions, e.g., changing from RC3 to RC4 or vice versa, changes spreading code usage by shifting the targeted data users from 64-length Walsh codes to 128-length Walsh codes, or vice versa. Use of 128-length Walsh codes expands the available code space and thus represents a net gain in available Walsh codes. Thus, release controller 52 can, at least to some extent, manipulate both power and spreading code usage levels by changing or modifying radio configurations, channel encoding rates, etc.

In targeting one or more of the current data users for resource release, the release controller 52 may be configured according to one or more overall service objectives. For example, release controller 52 may be configured according to a service "fairness" objective that avoids over penalizing any one of the current data users. Thus, rather than targeting one or a small number of data users for resource release, it targets a larger number such that a relatively small portion of the total resource amount to be released in the aggregate is taken from each one of them.

Conversely, release controller 52 may be configured to achieve a throughput objective (i.e., to optimize packet data throughput for the sector). With such a configuration, the release controller 52 may target the "worst" or most inefficient ones of the current data users for resource release, even if such targeting is not fair in terms of the average throughput to respective ones of the current data users. Such an approach essentially penalizes the data user(s) that currently are in the poorest radio conditions.

More generally, the release controller 52 can rank the current data users according to any desired criteria, such as an "efficiency metric," and then select one or more of them as targets for resource release based on rank order. The criteria may comprise transmit power, data rate, a ratio of the transmit power to the data rate, or any other criteria that provides a performance or efficiency metric for ranking users. Once ranked, the release controller 52 selects as many data users as is required to achieve the targeted release amount.

In some embodiments, release controller 52 may place further constraints on the selection process described above. For example, one or more current data users may have service plans that include minimum rate guarantees or other service guarantees. Users with guaranteed data rates typically pay a premium to guarantee a predetermined minimum data rate for their packet data communications. Other data users may be engaged in particular applications or services that require minimum data rates, or that have other Quality of Service (QoS) constraints associated with them, such as minimum packet latencies, etc.

Release controller 52 may exclude data users having these or other service constraints associated with them from its resource release operations. Alternatively, it may consider such users as candidates for resource release operations but if so, it ensures that the resource release imposed on any particular data user does not violate any service constraints applicable to that user. Thus, release controller 52 can perform resource release operations while adhering to the mandates of users' service plans or QoS requirements by maintaining required minimum rates, latencies, etc. for the data users as needed.

Figure 6:
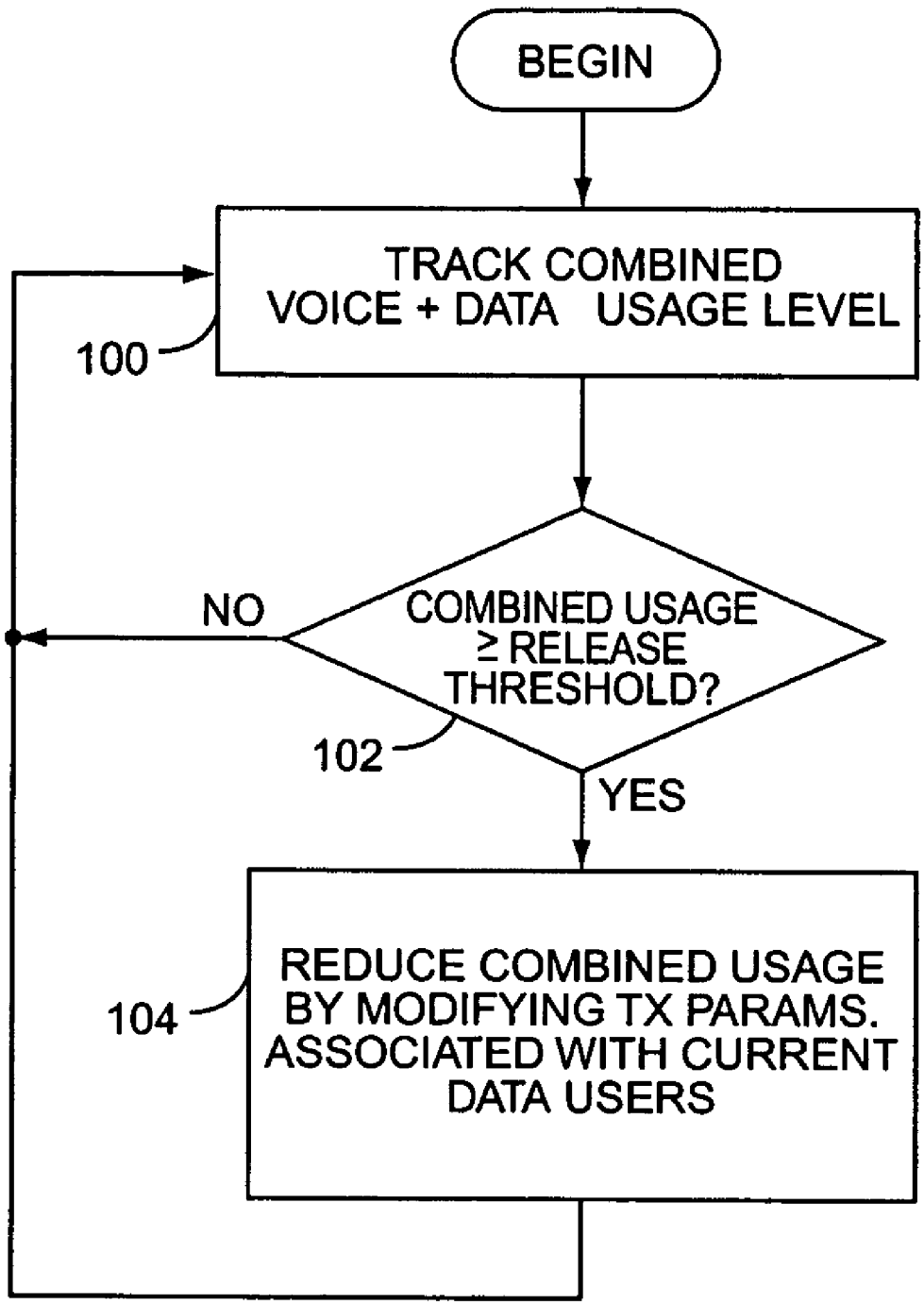
FIG. 6 is a diagram of exemplary processing logic according to an embodiment of the present invention.

FIG. 6 illustrates a general method for implementing an exemplary embodiment of the present invention. As shown in FIG. 6, monitor circuits 54 track the combined voice and data usage level for a shared resource of interest (Step 100) and compare the combined usage level to a release threshold (Step 102). If the combined usage level is less than the release threshold, the monitor circuits 54 continue tracking the combined usage level. However, if the combined usage level meets or exceeds the release threshold, the release controller 52 reduces the combined usage by modifying service to one or more of the current data users (Step 104). As noted earlier, modifying service may comprise, but is not limited to, reducing transmit power, reducing or changing a channel encoding rate, changing radio configurations, changing channel data rates, etc. The monitor circuits 54 continue tracking the combined usage level to perform any subsequently required resource releases.

Figure 7:
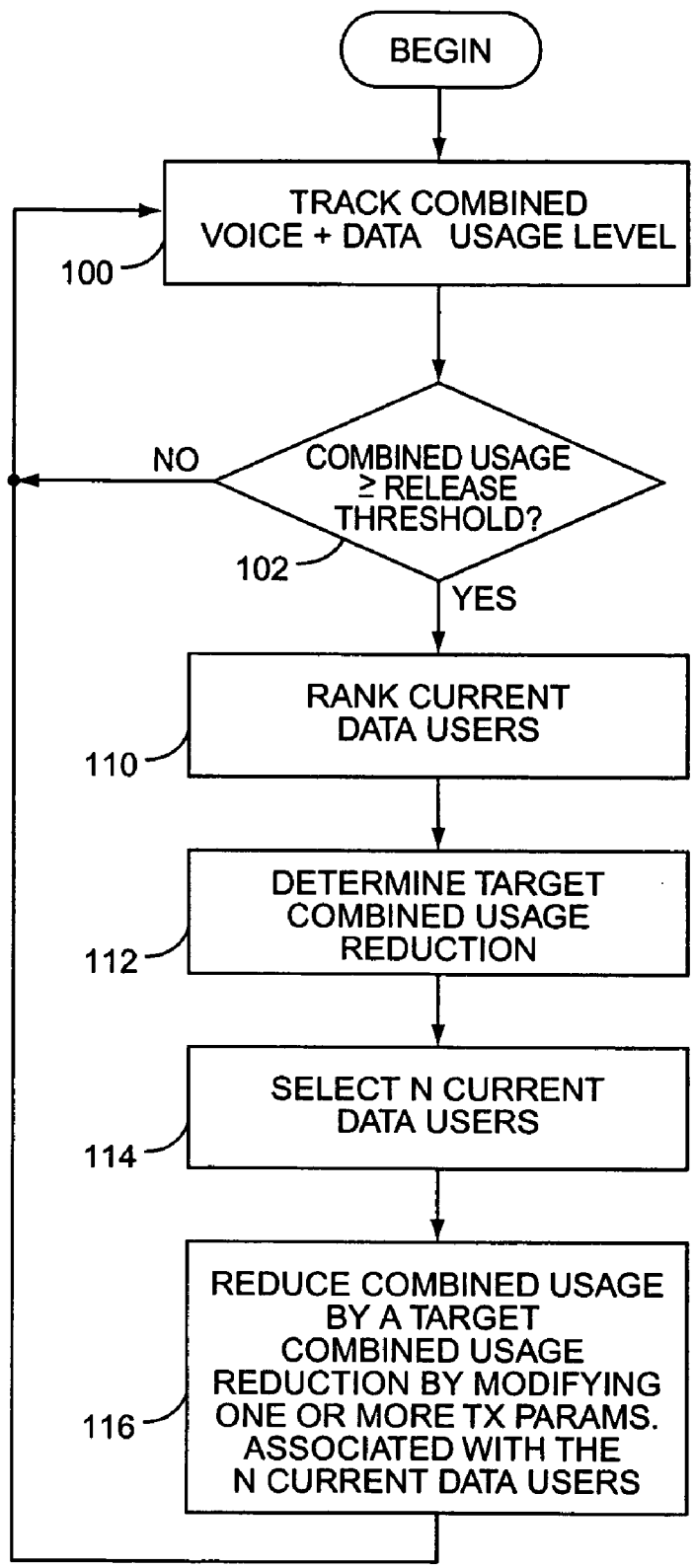
FIG. 7 is a diagram of exemplary processing logic according to another embodiment of the present invention.

FIG. 7 illustrates another exemplary method of the present invention. As with FIG. 6, monitor circuits 54 track the combined voice and data usage level (Step 100) and compare the combined usage level to a release threshold (Step 102). If the combined usage level is less than the release threshold, then monitor circuits 54 continue to track the combined usage level (Step 100). However, if the combined usage level meets or exceeds the release threshold, then release controller 52 ranks the current data users according to desired criteria (Step 110). Release controller 52 determines a target usage reduction amount (Step 112) and then selects one or more current data users in rank order from which to release resources in an aggregate amount equal to the targeted (desired) amount of reduction.

Thus, an exemplary release controller 52 thus effects a reduction in resource usage by an amount calculated to release the desired "amount" of the network resource, or resources, in question. More broadly, the present invention effects a reduction in data services "overhead" responsive to detecting a congestion condition by modifying ongoing data services of one or more current data services users that are selected as targets for service modification. The reduction in data services overhead at least partially relieves the congestion condition, thereby increasing the capacity of the network with respect to providing voice services.

In this context, as is consistent with the above details, a "congestion condition" may be defined as circumstances where the capacity utilization of one or more network resources, e.g., spreading codes and/or available transmit power, is approaching a blocking threshold. More broadly, however, a congestion condition denotes essentially any limiting condition affecting the network's ability to sustain ongoing services and/or to admit new users (particularly voice services users) in one or more coverage areas. In this sense, then, the congestion condition may denote a high level of forward and/or reverse link loading.

By way of non-limiting example, forward link loading in a given radio sector may be determined as a function of allocated transmit power, or by determining a ratio of total power to pilot power. Reverse link loading for a given sector may be measured in terms of total received power, rise-over-thermal measurements, or by other methods known to those skilled in the art. In any case, it should be appreciated that the present invention is configured in a broad sense to at least partially relieve detected congestion by lowering the overhead of current data services, to thereby free resources or capacity to allocation to voice services.

Figure 8:
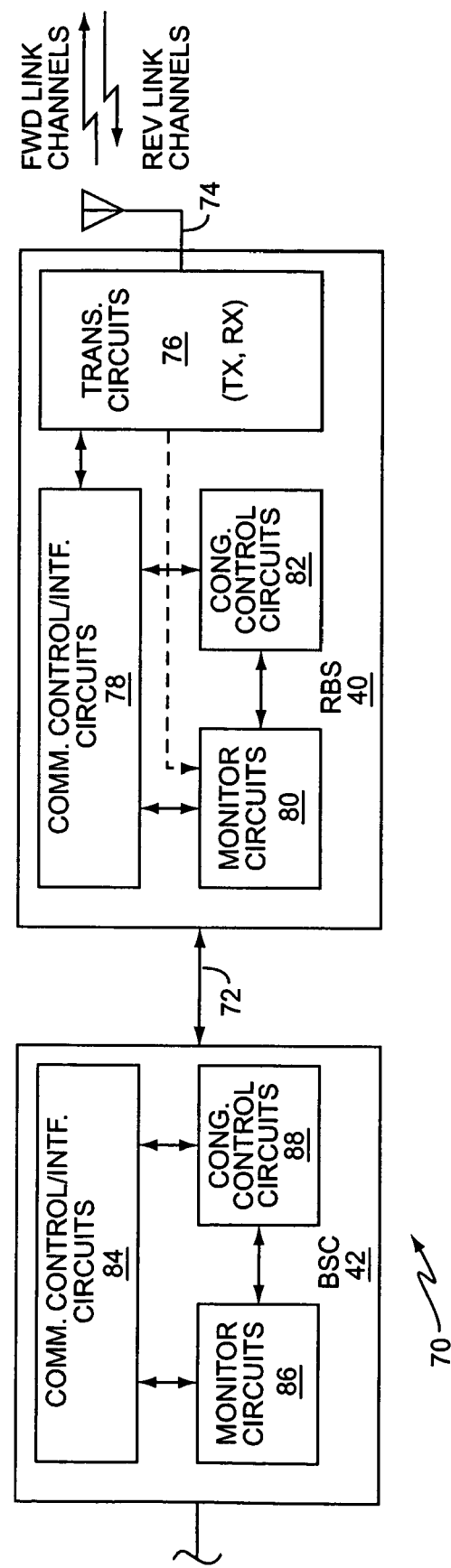
FIG. 8 is a diagram of an exemplary base station system according to one or more embodiments of the present invention.

Thus, FIG. 8 illustrates an exemplary base station system 70 that comprises exemplary embodiments of radio base station 40 and base station controller 42, wherein these two entities are communicatively coupled together via one or more backhaul links 72. Radio base station 40, which is associated with one or more antenna assemblies 74, provides a wireless communication interface to a plurality of mobile stations 18 via a number of forward and reverse link channels.

Those skilled in the art will appreciate that, while the illustrated embodiment represents an exemplary base station system configuration, other configurations are possible. For example, some network architectures may consolidate all or some of the functionality of base station controller 42 in base station 40. In that sense, then, it should be understood that one or more embodiments of the present invention may be carried out based on processing in both the base station controller 42 and the radio base station 40, or in either one.

Returning to the illustrated embodiment, radio base station 40 comprises transceiver circuits 76 to send and receive wireless signals on the forward and reverse links, communication control/interface circuits 78 to manage such signaling and to communicate with BSC 42, one or more monitoring circuits 80 to detect (network) congestion conditions, such as high power or spreading coding usage at RBS 40, and one or more congestion control circuits 82 configured to reduce data services overhead responsive to the detection of a congestion condition by the monitoring circuits 80. Similarly, the illustrated BSC 42 comprises communication control/interface circuits 84 to communicate with the CSCN 14, PSCN 12, and RBSs 40, one or more (congestion) monitoring circuits 86 to detect (network) congestion conditions, and one or more congestion control circuits 88 to reduce data services overhead responsive to the detection of congestion.

To the extent that congestion detection function between the BSC 42 and the RBS 40 are duplicative congestion monitoring and control need not be implemented in both entities. For example, the present invention contemplates omitting circuits 86 and 88 from BSC 42 to the extent that their detection and control operations would be the same as those of the corresponding circuits 80 and 82 in the RBS 40.

Of course, converse holds true in that monitoring and control circuits may be eliminated from RBS 40 to the extent that they are duplicative (and no more advantageous) than similar circuits implemented in BSC 42. However, it further should be understood that there may be benefits to implementing congestion monitoring and control circuits in both entities, such as where the RBS 40 is best positioned to detect local congestion conditions, i.e., tracking the amount of forward link power currently being used at the RBS 40, and the BSC 42 is best positioned to detect sector loading conditions, spreading code availability in one or more sectors, etc.

In these contexts, FIG. 9 illustrates exemplary processing logic that can be implemented in the BSC 42, the RBS 40, or some combination thereof. In any case, the exemplary wireless communication network monitors for a congestion condition (Step 120). For example, base station 70 may monitor for power or spreading code utilization levels that impact the ability to admit new voice users.

If congestion is detected (Step 122), the base station system 70 reduces data services overhead to increase network resources available for voice services in response to detecting a congestion condition by modifying ongoing data services of one or more targeted ones in a plurality of current data services users (Step 124). Identifying the targeted ones in the plurality of current data services users can be based at least in part on channel quality information received for one or more in the plurality of current data services users. For example, at least some of the current data services users, e.g., mobile stations 18 having data connections in the service area or areas relevant to the detected congestion conditions(s), can be ranked according to channel quality indicators received for those users. The mobile stations selected as targets for service modification can thus be selected in rank order so that data service modifications are carried out on those users in the worst radio conditions.

Channel quality information may be received from some or all of the current data services users in the form or reported pilot strengths (e.g., Periodic Pilot Strength Measurement Messages or PPSMMs) and, additionally, at least some of the current data services users may report channel quality information by sending Channel Quality Indictors, or the like. Typically, such channel quality information is available at a higher rate than PPSMM information, and thus provides a frequently updated basis for ranking users. For example, for certain types of data services, cdma2000-based mobile terminals transmit Channel Quality Indicators to the network at 800 Hz. Wideband CDMA (WCDMA) terminals similarly transmit channel quality information at relatively high rates, e.g., many times per second. The Channel Quality Indicators (CQIs) received respective ones of the current data services users can be averaged or otherwise filtered, such that smoothed CQI values are used for evaluation.

Thus, identifying the targeted ones in a plurality of current data services users may comprise ranking one or more of the current data services users according to at least one of received channel quality indicators and received pilot strength measurement reports, and selecting one or more of those current data services users in rank order as the targeted ones. Whether one or both CQIs and PPSMMs are used, identifying the targeted ones in the plurality of current data services users comprises determining a proportionally fair ranking of one or more of the current data services users as a function of average data throughputs and received channel quality indicators for those current data services users, and selecting one or more of those current data services users in rank order as the targeted ones.

In at least one embodiment, different types of received channel quality information are "normalized" to a common reference, such that the same ranking metric scale is used for current data services users, whether such users report pilot strength measurements, channel quality indicators, both, or some other values that are in some way indicative of the channel quality of the reporting mobile station 18. Thus, identifying the targeted ones in the plurality of current data services users may comprise receiving channel quality indicators from one or more of the current data services users and receiving pilot strength measurement reports from one or more other ones of the current data services users, translating the channel quality indicators and the pilot strength measurement reports into ranking metrics, ranking the current data services users according to their corresponding ranking metrics, and selecting one or more of them in rank order as the targeted ones. Such a methodology permits the ranking circuit to use a commonly scaled ranking metric for all data services users being ranked for modification target selection, even if those users report different types of channel quality information.

In terms of actually relieving the detected congestion conditions, either or both the congestion control circuits 82 and 88 can be configured to modify ongoing data services of one or more targeted ones in a plurality of current data services users by lowering forward link data rates of the targeted ones. For example, in a cdma2000 network embodiment, the data rates of one or more current data services users' forward supplemental channels (F-SCHs) can be lowered to reduce the power and/or spreading code resources needed to support those channels. Similarly data rate adaptations can be carried out in other network types, including WCDMA networks. Further, rather than simply adjusting data rates downward, data services overhead can be reduced by tearing down one or more forward link data channels being used to serve the one or more current data services users targeted for service modification.

This tear-down action is appropriate where, for example, data service can be continued for a given data services user on a lower-rate fundamental channel. Thus, an exemplary method of reducing data services overhead comprises, for each targeted data services user, removing a forward link supplemental channel used for data services, or lowering a data rate of a forward link supplemental channel used for data services. Of course, such modifications may be done with respect to the QoS requirements of the individual data services users, which may derive from the type of applications being run by those users and/or by the designated user class of those users (e.g., premium, non-premium, etc.).

As is explained in greater detail later herein, a reduction in data services overhead also can be effected by modifying ongoing data services of one or more targeted ones in a plurality of current data services users based on, for at least one of the targeted ones, shifting forward link traffic from a dedicated forward link channel to a shared forward link channel. Regardless of whether such shifting is used alternatively to data rate lowering, or in addition to data rate lowering, FIG. 10 illustrates exemplary functional circuits that may be implemented in one or both the congestion control circuits 82 and 88.

In the context of FIG. 10, channel quality information is received for a set of current data services users, which may be some or all of the data services users currently operating in one or more areas of the network 10 that are of interest with respect to relieving a detected congestion condition. A channel quality information processor 90 may be configured to generate a ranking metric for each one of the users, based on the channel quality information received for that user. In some configurations, the ranking metric simply may be a smoothed representation of received channel quality indicators, thus processor 90 may include one or more filtering circuits. In other embodiments, as noted, processor 90 may include calculation circuits configure to translate different kinds of received channel quality information, e.g., PPSMMs and CQIs, into the same type of ranking metric so that a common scale can be used for ranking all users being evaluated.

With the ranking metrics thus generated, ranking and targeting circuits 92 and 94 can be configured to place the users in rank order for selection as targets for service modification. As noted earlier herein, it may be that a particular amount of congestion reduction is desired, e.g., a five percent reduction in allocated forward link power, and circuits 92 and 94 can be configured to determine or estimate the congestion reduction gained for given service modifications to each of one or more of the ranked users, so that the number of users targeted for service modification is based on achieving the desired aggregate reduction in congestion.

Of course, the number of users that must be selected to achieve a given aggregate reduction in data services overhead depends on how severely each user's current data services will be constrained. In some instances, it will be desirable to make relatively minor changes to a number of users, and in other instances it will be preferable to make more dramatic service changes to one or a small number of users. Regardless, an overhead reduction circuit 96 is configured to carry out, or to initiate, the indicated service modifications to effect a reduction in data services overhead.

Figure 12:
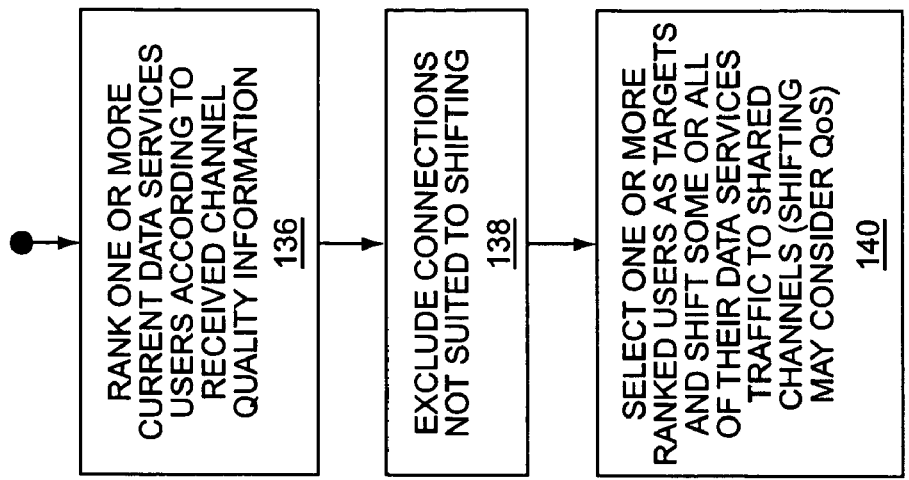
FIG. 12 is a diagram of exemplary user ranking to select one or more targets for service modification according to the processing logic of FIG. 11.
Figure 11:
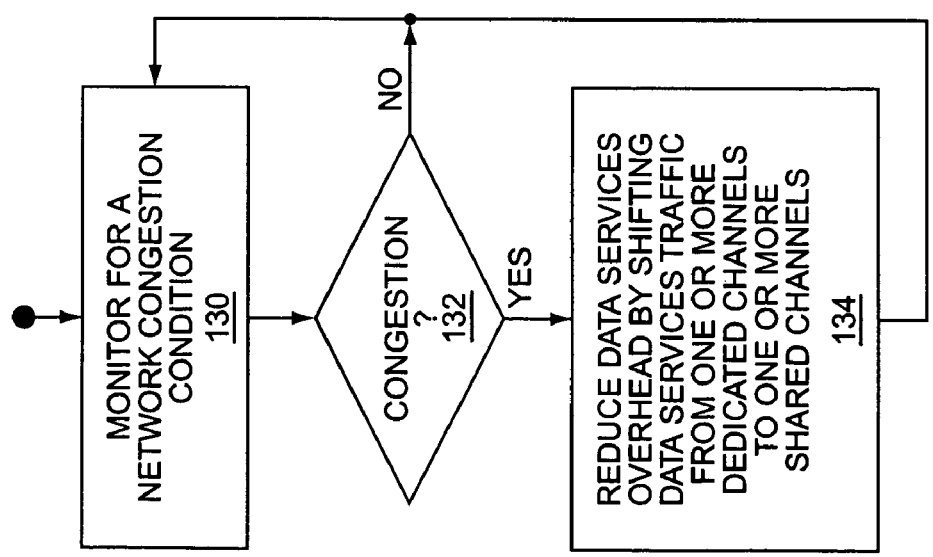
FIG. 11 is a diagram of exemplary processing logic to provide dynamic prioritization of user types according to one or more embodiments of the present invention.

FIGS. 11 and 12 focus in particular on making service modifications through traffic shifting. That is, FIG. 11 illustrates exemplary processing logic for dynamically prioritizing voice services over data services by monitoring for and detecting a congestion condition (Step 130), and shifting data services traffic from one or more dedicated channels to one or more shared channels responsive to detecting the congestion condition (Steps 132 and 134). Note that in this context, the congestion may relate to the forward link, to the reverse link, or to both. Thus, traffic shifting may be carried out on the forward and reverse links, in dependence on the particular congestion condition(s) detected.

For example, detecting a congestion condition may comprise detecting that usage of at least one of transmit power resources and spreading code resources at a given RBS 40 is at or above a defined usage threshold. Congestion detection also may comprise detecting that forward or reverse link loading is approaching an admissions blocking threshold or, more generally, detecting that the utilization level of one or more network resources is approaching one or more admission blocking thresholds.

Regardless of the particular congestion detection mechanism, FIG. 12 illustrates exemplary logic for effecting the desired reduction in data services overhead. Exemplary processing begins with ranking those current data services users that are candidates for service modification (Step 136). Such ranking may be based on received channel quality information, such that users in poor radio conditions are targeted first. Again, such rankings can be modified based on other considerations, such as fairness of service. Further, data connections that are subject to service requirements, e.g., QoS constraints that cannot be met on shared channel services, or that are impractical to meet on such shared channels, are excluded from the data traffic considered for shifting (Step 138).

After making any such exclusions, exemplary processing logic selects one or more of the ranked users as targets for having some or all of their ongoing data services traffic shifted from respective dedicated channels, to one or more shared channels (Step 140). In the forward link, this may comprise, for example, moving data traffic from a forward link supplemental channel currently allocated to a given data services user onto a shared forward link packet data channel.

Thus, in at least in a cdma2000 or WCDMA embodiment, packet data that is being carried on a dedicated traffic channel is shifted to a high-speed shared packet data channel. The dedicated channel can be released, or dropped to some minimum data rate, and the corresponding resources recovered for voice services allocation. Also, where the congestion condition concerns reverse link loading, one or more embodiments of base station system 70 may be configured to shift reverse link data services traffic for one or more targeted users from respective dedicated reverse link traffic channels assigned to those targets to one or more shared reverse link traffic channels.

Moreover, base station system 70 can be configured to perform a reverse shifting of traffic from a shared channel back to a dedicated channel. For example, base station system 70 can be configured to move previously shifted traffic back to a dedicated channel, for example, in response to detecting that the congestion condition which prompted the earlier dedicated-to-shared traffic shifting has been relieved.

In setting out this configuration in more detail, an embodiment of base station system 70 is configured to move traffic from a dedicated channel to a shared channel, which allows the dedicated channel to be released completely, or to be reconfigured to a lower data rate, either of which frees resources, and thereby helps alleviate the detected congestion condition. At some later, point, the base station system 70 may shift that traffic back to a dedicated channel, either by resuming a higher data rate on a retained dedicated channel, or by setting up a new dedicated channel. The shifting back can be triggered by detecting that the previously detected congestion condition is wholly or at least partly relieved, and the shift-back criteria can be adjusted to avoid overly frequent shifting of traffic back and forth between shared and dedicated channels. For example, if a first congestion threshold is used to trigger the shift to a shared channel, then a lower threshold may be used to trigger the shift back to a dedicated channel, i.e., hysteresis can be used.

In any case, as those skilled in the art will appreciate, shared packet data channels typically are used to carry data traffic for a potentially large number of users in shared fashion by time multiplexing each user's traffic onto the channel. Thus, in a typical arrangement, only one user is served at any given instant in time. The average data rate enjoyed by a given shared channel user thus is a function of that user's radio conditions, and of how frequently and for how long the shared channel is given over to carrying that user's traffic.

Since the traffic being shifted over from the dedicated channels may be associated with particular QoS constraints, or other service guarantees, such traffic may be assigned shared channel scheduling priorities that maintain, or at least approximate, the same service constraints. Thus, if traffic is shifted from a dedicated channel that was configured for a specific data rate, or for specific packet data QoS constraints (e.g., jitter, latency, overall delay, etc.), then a sufficiently high scheduling priority can be associated with that data connection such that the user enjoys substantially equivalent data service on the shared channel.

Of course, traffic shifting may not be appropriate for some data services users, and the exemplary base station system 70 can be configured to reduce data service overhead by carrying out data rate lowering operations in addition to, or as an alternative to, traffic shifting. In either case, the present invention contemplates one or more network entities, such as base station system 70, that are configured to prioritize voice over data services by reducing data services overhead responsive to detecting a congestion condition that threatens to interfere with ongoing or new voice services. Such data services overhead reduction can be carried out, for example, by lowering the data rates of one more targeted traffic channels, or by shifting traffic to shared packet data channels.

Thus, the present invention is not limited by the foregoing details, nor is it limited by the exemplary embodiments appearing in the accompanying figures. Indeed, the present invention is limited only by the following claims and their reasonable equivalents.

What is claimed is:

1. In a wireless communication network providing both voice and data services, a method of dynamically prioritizing voice services over data services comprising:
   reducing data services overhead to increase network resources available for voice services in response to detecting a congestion condition by modifying ongoing data services of one or more targeted ones in a plurality of current data services users; and
   identifying the targeted ones in the plurality of current data services users based at least in part on channel quality information received for one or more in the plurality of current data services users.

2. The method of claim 1, wherein identifying the targeted ones in the plurality of current data services users comprises ranking one or more current data services users according to channel quality indicators received for those current data services users, and selecting one or more of those current data services users in rank order as the targeted ones.

3. The method of claim 1, wherein identifying the targeted ones in the plurality of current data services users comprises ranking one or more of the current data services users according to at least one of received channel quality indicators and received pilot strength measurement reports, and selecting one or more of those current data services users in rank order as the targeted ones.

4. The method of claim 1, wherein identifying the targeted ones in the plurality of current data services users comprises determining a proportionally fair ranking of one or more of the current data services users as a function of average data throughputs and received channel quality indicators for those current data services users, and selecting one or more of those current data services users in rank order as the targeted ones.

5. The method of claim 1, wherein identifying the targeted ones in the plurality of current data services users comprises receiving channel quality indicators from a set of current data services users, determining a proportionally fair ranking of the set based on respective channel quality indicators and respective average data rates, and selecting one or more members of the set in rank order as the targeted ones.

6. The method of claim 1, wherein identifying the targeted ones in the plurality of current data services users comprises receiving channel quality indicators from one or more of the current data services users and receiving pilot strength measurement reports from one or more other ones of the current data services users, translating the channel quality indicators and the pilot strength measurement reports into ranking metrics, ranking the current data services users according to their corresponding ranking metrics, and selecting one or more of them in rank order as the targeted ones.

7. The method of claim 1, wherein modifying ongoing data services of one or more targeted ones in a plurality of current data services users comprises lowering forward link data rates of the targeted ones.

8. The method of claim 1, wherein modifying ongoing data services of one or more targeted ones in a plurality of current data services users comprises tearing down one or more forward link data channels being used to serve the targeted ones.

9. The method of claim 1, wherein modifying ongoing data services of one or more targeted ones in a plurality of current data services users comprises, for each targeted one, removing a forward link supplemental channel used for data services, or lowering a data rate of a forward link supplemental channel used for data services.

10. The method of claim 1, wherein modifying ongoing data services of one or more targeted ones in a plurality of current data services users comprises, for at least one of the targeted ones, shifting forward link traffic from a dedicated forward link channel to a shared forward link channel.

11. The method of claim 1, wherein modifying ongoing data services of one or more targeted ones in a plurality of current data services users comprises, for a given targeted one, shifting forward link traffic from a supplemental channel currently assigned to the given targeted one to a shared forward link packet data channel, and either tearing down the supplemental channel or lowering a data rate of the supplemental channel.

12. The method of claim 11, further comprising determining a scheduling priority for the shifted traffic on the shared forward link packet data channel based on one or more Quality-of-Service parameters associated with the supplemental channel prior to shifting the forward link traffic.

13. The method of claim 1, wherein modifying ongoing data services of one or more targeted ones in a plurality of current data services users comprises determining whether a data service currently being carried on a dedicated forward link channel for a given targeted one are suitable for transfer to a shared forward link channel and, if so, shifting at least a portion of data traffic associated with that data service to a shared forward link channel.

14. The method of claim 1, wherein, in an IS-2000 wireless communication network, modifying ongoing data services of one or more targeted ones in a plurality of current data services users comprises, for each of one or more of the targeted ones, shifting forward link traffic from a forward supplemental channel (F-SCH) to a shared forward packet data channel (F-PDCH).

15. A method of prioritizing voice service over data service in a wireless communication network, the method comprising:
monitoring a combined usage of a shared network resource by current voice and data users; and
if the combined usage exceeds a resource release threshold, selecting one or more current data users as targets for ongoing service modification based at least in part on reported channel quality information, and reducing the combined usage by a desired amount by modifying ongoing service to the targeted one or more current data users.

16. In a wireless communication network providing both voice and data services, a method of dynamically prioritizing voice services over data services comprising:
detecting a congestion condition; and
shifting data services traffic from one or more dedicated channels to one or more shared channels responsive to detecting the congestion condition.

17. The method of claim 16, wherein detecting a congestion condition comprises detecting that usage of at least one of transmit power resources and spreading code resources is at or above a defined usage threshold.

18. The method of claim 16, wherein detecting a congestion condition comprises detecting that network resource usage is approaching one or more admission blocking thresholds.

19. The method of claim 16, wherein shifting data services traffic from one or more dedicated channels to one or more shared channels responsive to detecting the congestion condition comprises identifying one or more current data services users as targets for data services traffic shifting, and shifting at least some of the data services traffic for those targets from corresponding dedicated traffic channels to one or more shared traffic channels.

20. The method of claim 19, wherein shifting at least some of the data services traffic for those targets from corresponding dedicated traffic channels to one or more shared traffic channels comprises, for a given target, shifting reverse link data services traffic from a dedicated reverse link traffic channel assigned to that target to a shared reverse link traffic channel.

21. The method of claim 19, wherein shifting at least some of the data services traffic for those targets from corresponding dedicated traffic channels to one or more shared traffic channels comprises, for a given target, shifting forward link data services traffic from a dedicated forward link traffic channel assigned to that target to a shared forward link traffic channel.

22. The method of claim 16, further comprising assigning shared channel scheduling priorities to the shifted traffic in accordance with one or more Quality-of-Service parameters associated with the dedicated channels.

23. The method of claim 16, further comprising identifying one or more current data services users as targets for traffic shifting based on evaluating channel quality information received for the one or more current data services users.

24. The method of claim 16, further comprising identifying one or more current data services users that have one or more dedicated data services traffic channels assigned to them, ranking those current data services users according to channel quality information received for them, and selecting one or more of those current data services users in rank order as targets for said shifting of traffic.

25. A base station system for use in a wireless communication network providing both data services and voice services, said base station system comprising:
   one or more monitoring circuits configured to detect a congestion condition; and
   one or more control circuits operatively associated with the one or more monitoring circuits and configured to reduce data services overhead responsive to detection of the congestion condition based on modifying ongoing data services of one or more targeted ones in a plurality of current data services users; and
   said one or more control circuits further configured to identify the targeted ones in the plurality of current data services users based at least in part on channel quality information received for one or more in the plurality of current data services users.

26. The base station system of claim 25, wherein said base station system comprises one or more radio base stations, and further comprises a base station controller communicatively coupled to the one or more radio base stations.

27. The base station system of claim 25, wherein the one or more monitoring circuits comprise forward link transmit power monitoring circuits that are configured to monitor forward link transmit power usage at the one or more radio base stations.

28. The base station system of claim 25, wherein the one or more monitoring circuits comprise forward link spreading code monitoring circuits that are configured to monitor forward link transmit spreading code usage at the one or more radio base stations.

29. The base station system of claim 26, wherein the one or more control circuits are configured to identify the targeted ones in the plurality of current data services users by ranking one or more current data services users according to channel quality indicators received for those current data services users, and selecting one or more of those current data services users in rank order as the targeted ones.

30. The base station system of claim 25, wherein the one or more control circuits are configured to identify the targeted ones in the plurality of current data services users by ranking one or more of the current data services users according to at least one of received channel quality indicators and received pilot strength measurement reports, and selecting one or more of those current data services users in rank order as the targeted ones.

31. The base station system of claim 25, wherein the one or more control circuits are configured to identify the targeted ones in the plurality of current data services users by determining a proportionally fair ranking of one or more of the current data services users as a function of average data throughputs and received channel quality indicators for those current data services users, and selecting one or more of those current data services users in rank order as the targeted ones.

32. The base station system of claim 25, wherein the one or more control circuits are configured to identify the targeted ones in the plurality of current data services users by receiving channel quality indicators from a set of current data services users, determining a proportionally fair ranking of the set based on respective channel quality indicators and respective average data rates, and selecting one or more members of the set in rank order as the targeted ones.

33. The base station system of claim 25, wherein the one or more control circuits are configured to identify the targeted ones in the plurality of current data services users by receiving channel quality indicators from one or more of the current data services users and receiving pilot strength measurement reports from one or more other ones of the current data services users, translating the channel quality indicators and the pilot strength measurement reports into ranking metrics, ranking the current data services users according to their corresponding ranking metrics, and selecting one or more of them in rank order as the targeted ones.

34. The base station system of claim 25, wherein the one or more control circuits modify ongoing data services of one or more targeted ones in the plurality of current data services users comprises at least one of lowering a data rate for data services of one or more of the targeted ones and shifting data services traffic from a dedicated channel to a shared channel for one or more of the targeted ones.

35. The base station system of claim 25, wherein the one or more control circuits modify ongoing data services of one or more targeted ones in the plurality of current data services comprises, for a given targeted one, reassigning data services traffic from a traffic channel dedicated to the given targeted one to a shared traffic channel, and releasing the dedicated traffic channel.

36. The base station system of claim 35, wherein the one or more control circuits are further configured to determine a scheduling priority for the reassigned data services traffic on the shared channel based on one or more Quality-of-Service parameters that were applicable to the reassigned data services traffic when it was being carried on the dedicated channel.

37. The base station system of claim 25, wherein the base station system comprises an IS-2000 base station system, and wherein the one or more control circuits are configured to modify ongoing data services of at least one of the targeted ones by shifting ongoing data services traffic from a supplemental data channel assigned to that targeted one to a shared packet data channel.

38. A base station system for use in a wireless communication network providing both voice and data services, the base station system comprising:
   one or more monitoring circuits configured to detect a congestion condition; and
   one or more control circuits to shift data services traffic from one or more dedicated channels to one or more shared channels responsive to detecting the congestion condition.

39. The base station system of claim 38, wherein the one or more monitoring circuits are configured to detect the congestion condition by detecting the usage of at least one of transmit power resources and spreading code resources is at or above a defined usage threshold.

40. The base station system of claim 38, wherein the one or more monitoring circuits are configured to detect a congestion condition by detecting that network resource usage is approaching one or more admission blocking thresholds.

41. The base station system of claim 38, wherein the one or more control circuits are configured to shift data services traffic from one or more dedicated channels to one or more shared channels responsive to detecting the congestion condition by identifying one or more current data services users as targets for data services traffic shifting, and shifting at least some of the data services traffic for those targets from corresponding dedicated traffic channels to one or more shared traffic channels.

* * * * *

UNITED STATES PATENT AND TRADEMARK OFFICE
CERTIFICATE OF CORRECTION

| | | |
|---|---|---|
| PATENT NO. | : 7,773,502 B2 | Page 1 of 1 |
| APPLICATION NO. | : 10/857197 | |
| DATED | : August 10, 2010 | |
| INVENTOR(S) | : Vannithamby et al. | |

It is certified that error appears in the above-identified patent and that said Letters Patent is hereby corrected as shown below:

On the Face Page, in Field (73), under "Assignee", in Column 1, Line 1, delete "lm" and insert -- LM --, therefor.

Signed and Sealed this

Seventeenth Day of May, 2011

David J. Kappos
*Director of the United States Patent and Trademark Office*